(12) United States Patent
Arnold

(10) Patent No.: US 9,975,648 B2
(45) Date of Patent: May 22, 2018

(54) USING RADAR DERIVED LOCATION DATA IN A GPS LANDING SYSTEM

(71) Applicant: THE BOEING COMPANY, Chicago, IL (US)

(72) Inventor: Larry Dean Arnold, Florissant, MO (US)

(73) Assignee: THE BOEING COMPANY, Chicago, IL (US)

( * ) Notice: Subject to any disclaimer, the term of this patent is extended or adjusted under 35 U.S.C. 154(b) by 228 days.

(21) Appl. No.: 14/959,125

(22) Filed: Dec. 4, 2015

(65) Prior Publication Data

US 2017/0297737 A1  Oct. 19, 2017

(51) Int. Cl.
| | |
|---|---|
| *G06F 19/00* | (2018.01) |
| *B64D 45/04* | (2006.01) |
| *G01S 19/15* | (2010.01) |
| *G01S 19/48* | (2010.01) |
| *G01S 13/86* | (2006.01) |
| *G01S 13/91* | (2006.01) |
| *G01S 19/46* | (2010.01) |
| *G05D 1/04* | (2006.01) |
| *G05D 1/06* | (2006.01) |

(52) U.S. Cl.
CPC .............. *B64D 45/04* (2013.01); *G01S 13/86* (2013.01); *G01S 13/913* (2013.01); *G01S 19/15* (2013.01); *G01S 19/46* (2013.01); *G01S 19/48* (2013.01); *G05D 1/042* (2013.01); *G05D 1/0684* (2013.01)

(58) Field of Classification Search
USPC ......................................................... 701/17
See application file for complete search history.

(56) References Cited

U.S. PATENT DOCUMENTS

| | | | |
|---|---|---|---|
| 5,952,961 A * | 9/1999 | Denninger | G01S 7/4004 342/357.3 |
| 8,909,471 B1 | 12/2014 | Jinkins et al. | |
| 2003/0102999 A1 | 6/2003 | Bergin et al. | |
| 2009/0242693 A1* | 10/2009 | Urnes, Sr. | B63B 35/50 244/63 |

(Continued)

FOREIGN PATENT DOCUMENTS

| | | |
|---|---|---|
| DE | 102007054628 A1 | 5/2009 |
| EP | 1022580 A2 | 7/2000 |

OTHER PUBLICATIONS

Extended European Search Report dated May 11, 2017 for Application No. 16199416.5-1812.

*Primary Examiner* — Tyler Paige
(74) *Attorney, Agent, or Firm* — Patterson + Sheridan, LLP

(57) ABSTRACT

In aspects herein, if GPS signals used as inputs into a GPS landing system become unreliable, an aircraft instead uses signals derived from radar data to operate the GPS landing system. Generally, GPS signals are unreliable if they cannot be received or if the signals are corrupted. Instead of using GPS signals, the landing system uses radar derived location data as inputs. In one example, the radar derived location data is generated using a radar system located at the intended landing site—e.g., an airport or aircraft carrier. The landing site transmits this data to the aircraft which processes the data using its GPS landing system that outputs control signals for landing the aircraft. Thus, even when GPS signals are unreliable, the aircraft can use the GPS landing system to land.

20 Claims, 5 Drawing Sheets

(56) References Cited

U.S. PATENT DOCUMENTS

| | | | | |
|---|---|---|---|---|
| 2009/0306840 A1* | 12/2009 | Blenkhorn | ........... | G05D 1/0676 |
| | | | | 701/16 |
| 2010/0256840 A1* | 10/2010 | Call | ................... | G01C 21/165 |
| | | | | 701/17 |
| 2014/0350754 A1* | 11/2014 | Elgersma | ............... | G08G 5/025 |
| | | | | 701/16 |
| 2015/0129716 A1* | 5/2015 | Yoffe | ....................... | B64F 1/02 |
| | | | | 244/110 C |
| 2017/0102713 A1* | 4/2017 | Lim | ................... | G05D 1/0684 |

\* cited by examiner

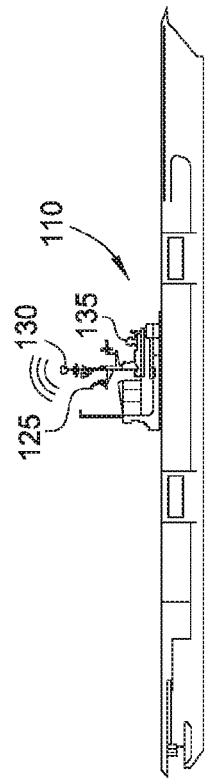
FIG. 1
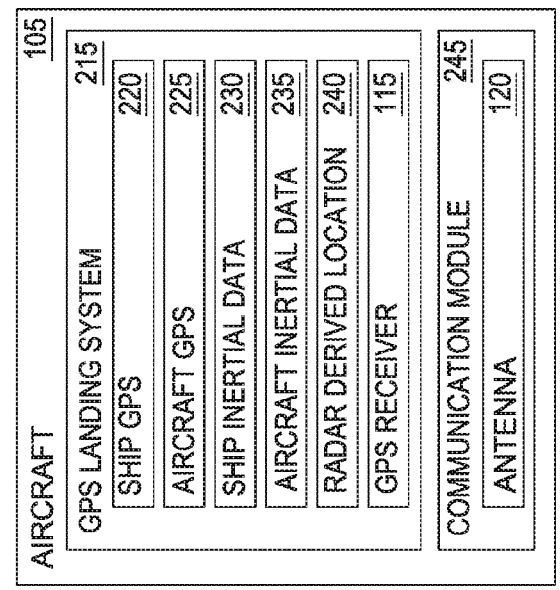
FIG. 2
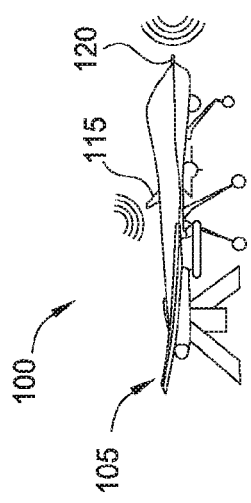
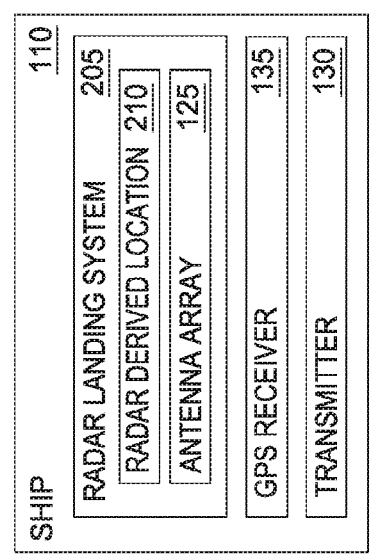

USING RADAR DERIVED LOCATION DATA IN A GPS LANDING SYSTEM

BACKGROUND

Instrument carrier landing systems (ICLS) can be used to aid pilots when landing on an aircraft carrier. Indicator needles are displayed for the pilot indicating aircraft position in relation to the desired glideslope and final bearing. An automatic carrier landing system (ACLS) may also display indicators that illustrate aircraft position in relation to the desired glideslope and final bearing. Additionally, the ACLS can be coupled to the autopilot systems in the aircraft via a data link from the ship allowing for a hands-off approach where command signals from the ACLS directly control the path of the aircraft.

SUMMARY

One aspect described herein is a method that includes operating a global position satellite (GPS) landing system to generate control signals for flying an aircraft using GPS signals as an input and receiving radar derived location data indicating a relative location of the aircraft to a landing site. The method includes operating the GPS landing system to generate control signals for flying the aircraft using the radar derived location data as the input, in lieu of the GPS signals.

In one aspect, in combination with the example method above, operating the GPS landing system using the GPS signals as the input is a normal operating state and operating the GPS landing system using the radar derived location data as the input is a backup operating state performed upon determining the GPS signals are unreliable.

In one aspect, in combination with any of the example methods above, the GPS signals are not used during the backup operating state and the radar derived location data is not used during the normal operating state.

In one aspect, in combination with any of the example methods above, the method includes determining, using a relative position calculator, a relative position of the aircraft to the landing site during the normal operating state based on a GPS location of the aircraft and a GPS location of the landing site, wherein the relative position calculator is unused when the GPS landing system operates in the backup operating state.

In one aspect, in combination with any of the example methods above, at least one component used in the GPS landing system when operating in the normal operating state is also used when operating in the backup operating state.

In one aspect, in combination with any of the example methods above, the radar derived location data indicates a distance from the aircraft to a touchdown point on the landing site, wherein the landing site is a ship.

In one aspect, in combination with any of the example methods above, the radar derived location data is generated using a radar antenna mounted on the ship.

In one aspect, in combination with any of the example methods above, the method includes receiving inertial data indicating movements of the ship and operating the GPS landing system using both the inertial data and the radar derived location data as inputs to fly the aircraft when GPS signals are unreliable.

Moreover, aspects herein include any alternatives, variations, and modifications of the preceding arrangement or configurations of the defense systems methods recited above.

Another aspect described herein is a system that includes a processor and memory storing an GPS landing application where the GPS landing application is executable by the processor to perform an operation. The operation includes generating control signals for flying an aircraft using GPS signals as an input and receiving radar derived location data indicating a relative location of the aircraft to a landing site. The system includes generating control signals for flying the aircraft using the radar derived location data as the input, in lieu of the GPS signals.

In one aspect, in combination with the example system above, generating control signals using the GPS signals as the input is a normal operating state of the GPS landing application and generating control signals using the radar derived location data as the input is a backup operating state of the GPS landing application performed upon determining the GPS signals are unreliable.

In one aspect, in combination with any of the example systems above, the GPS signals are not used during the backup operating state and the radar derived location data is not used during the normal operating state.

In one aspect, in combination with any of the example systems above, the operation includes determining, using a relative position calculator, a relative position of the aircraft to the landing site during the normal operating state based on a GPS location of the aircraft and a GPS location of the landing site, wherein the relative position calculator is unused when the GPS landing system operates in the backup operating state.

In one aspect, in combination with any of the example systems above, at least one component used in the GPS landing application when operating in the normal operating state is also used when operating in the backup operating state.

In one aspect, in combination with any of the example systems above, the radar derived location data indicates a distance from the aircraft to a touchdown point on the landing site, wherein the landing site is a ship.

In one aspect, in combination with any of the example systems above, the operation includes receiving inertial data indicating movements of the ship and generating control signals to fly the aircraft using both the inertial data and the radar derived location data as inputs when GPS signals are unreliable.

Moreover, aspects herein include any alternatives, variations, and modifications of the preceding arrangement or configurations of the systems recited above.

Another aspect described herein is a computer-readable storage medium having computer-readable program code embodied therewith. The computer-readable program code executable by one or more computer processors to operate a GPS landing system to generate control signals for flying an aircraft using GPS signals as an input and receive radar derived location data indicating a relative location of the aircraft to a landing site. The computer-readable program code is executable to operate the GPS landing system to generate control signals for flying the aircraft using the radar derived location data as the input, in lieu of the GPS signals.

BRIEF DESCRIPTION OF THE SEVERAL VIEWS OF THE DRAWINGS

FIG. 1 illustrates an ACLS for landing an aircraft on a ship;

FIG. 2 is a block diagram of a GPS landing system and a radar landing system;

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 3:
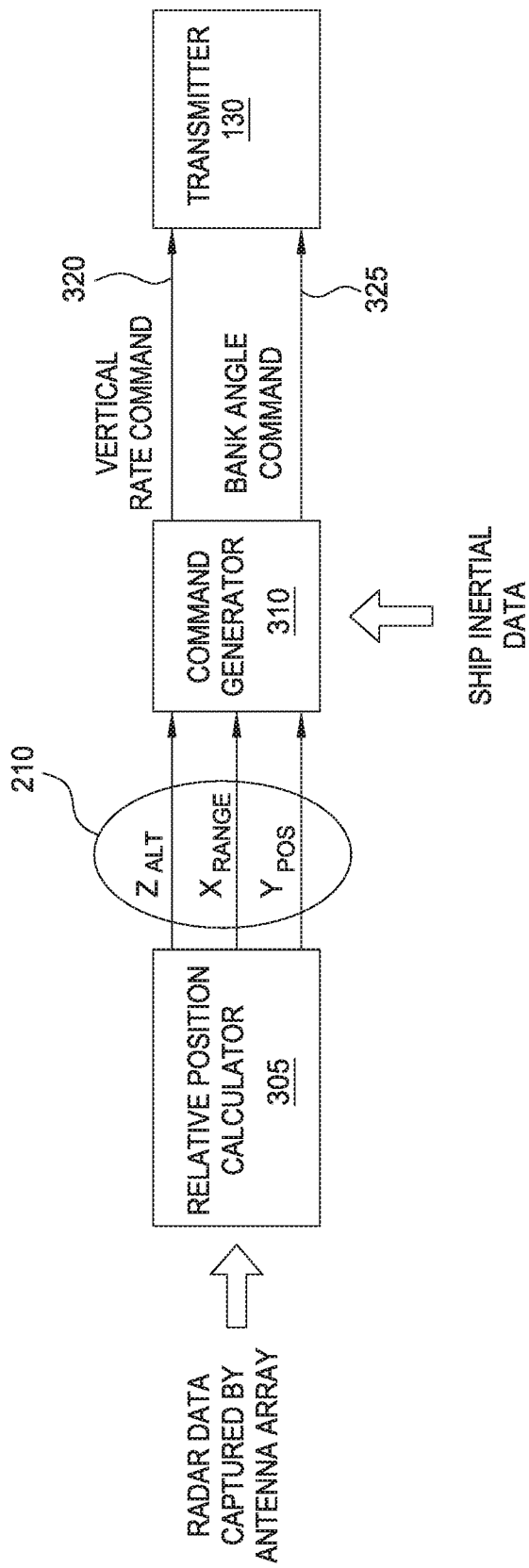
FIG. 3 is a block diagram of a radar landing system.

Different techniques may be used to implement an automatic carrier landing system (ACLS). In one aspect, radar is used to derive location data of an aircraft relative to a landing site—e.g., an aircraft carrier. These types of systems are referred to herein as radar landing systems. In another aspect, (global positional satellite) GPS signals are used to determine a location of an aircraft relative to a landing site. These types of systems are referred to herein as GPS landing systems.

In case of failure, an aircraft may be equipped with a both a GPS landing system and a radar landing system. For example, if a radar antenna fails, the aircraft can activate the GPS landing system and vice versa. However, with unmanned aerial vehicles (UAVs or drones), current radar landing system may lead to unpredictable results. For example, the SPN-46 algorithm (a type of radar landing system) may use human oversite in some situations like during wave off or when aborting an approach. In a UAV, which lacks human oversight, using the radar landing system during an approach may not be preferred. As such, the radar landing system may not provide a viable alternative should the GPS landing system on the UAV become unreliable.

In the aspects described herein, if the GPS signals used as inputs into the GPS landing system become unreliable, the aircraft instead uses signals derived from radar data to operate the GPS landing system. Generally, GPS signals are unreliable if they cannot be received or if the signals are corrupted. For example, GPS signals may be unreliable when a GPS receiver fails, the GPS signals are jammed, the GPS signals experience multipath, or the GPS receiver is occluded from the GPS satellite transmissions. In response, instead of using GPS signals, the aircraft uses radar derived location data provided by the radar landing system as inputs to the GPS landing system. In one example, the radar derived location data may be generated using a radar system located at the intended landing site—e.g., an airport or aircraft carrier. For example, the landing site includes a radar antenna which tracks the location of the aircraft to determine the relative location of the plane to the landing site. In one aspect, the landing site transmits this data to the aircraft which processes the data using the GPS landing system and outputs control signals for landing the aircraft. Thus, when GPS signals are unreliable, the aircraft can instead use radar derived location data to operate the GPS landing system to land.

In one aspect, the aircraft processes the radar derived location data using only a portion of the functions or modules in the GPS landing system. For example, the GPS landing system may include a module for determining the relative location of the aircraft to the landing site using GPS signals. Because the radar derived location data includes this information, this module may be unused when the radar derived data is the input to the GPS landing system. In contrast, the GPS landing system may include a flight definition module which generates control commands depending on the state of the aircraft. This module may be used regardless of the inputs. As such, the operations and functions of the GPS landing system may be modified depending on whether the GPS signals or the radar derived location data is used as inputs to the landing system.

FIG. 1 illustrates landing an aircraft 105 on a ship 110. The aircraft 105 may be a UAV or a manned aircraft. Moreover, the aircraft 105 may be a plane or a helicopter. The aircraft 105 includes at least one ACLS for automatically landing the aircraft 105 on the ship 110. In one aspect, the aircraft 105 includes a GPS landing system which uses signals received using a GPS receiver 115. So long as the received GPS signals are reliable, the GPS landing system provides control signals to a piloting system for landing the aircraft 105 on the ship 110. Of course, if the aircraft 105 is a manned aircraft, the pilot may be able to override the GPS landing system and manually land the aircraft 105.

Due to failure of a component, jamming, or multipath, the GPS signals may be unreliable which makes the control signals generated by the GPS landing system unreliable. Instead of switching to a different type of ACLS (e.g., a radar based landing system), the aircraft uses location data derived from a radar system located on the ship 110 to operate the GPS landing system. The aircraft 105 includes an antenna 120 that provides a data link between the aircraft and ship 110. Using this data link, the aircraft 105 receives the radar derived location data.

The ship 110 includes a radar antenna 125 for detecting the aircraft 105. Although the examples below are described using a ship (e.g., an aircraft carrier or a cruise ship with a helipad) as the landing site, the techniques below also work with stationary landing sites as well. For example, when landing on a mobile landing site, the landing systems may consider inertial data corresponding to the sites orientation, rotation, acceleration, etc. that are not consider when the landing site is stationary.

In one aspect, the radar antenna 125 includes a beam pattern shaped to include the glideslope the aircraft 105 follows as it approaches the ship 110. For example, the beam pattern may be a conical shape that extends from the rear of the ship 110. So long as the aircraft 105 is within the beam pattern, the radar antenna 125 generates data which can be processed to derive a location of the aircraft 105 relative to the ship 110. Using a transmitter 130, the ship 110 sends the radar derived location data to the antenna 120 on the aircraft 105.

Additionally, the ship 110 includes a GPS receiver 135 for identifying a GPS location of the ship 110. Using the transmitter 130, the ship 110 transmits its GPS location to the aircraft 105. In this manner, the aircraft 105 can execute a GPS landing system using its GPS location as well as the GPS location of the ship 110 to land. Although the examples herein describe using the radar derived location data to operate the GPS landing system when the GPS data becomes unreliable, in one aspect, the ship 110 includes a radar landing system for outputting commands for controlling the autopilot system of the aircraft 105. If the GPS landing system on aircraft 105 malfunctions (i.e., neither the GPS signals nor the radar derived location data provides reliable control signals for flying the aircraft 105), then the commands provided by the radar landing system executing on the ship 110 may be transmitted to the aircraft 105. Put differently, the radar landing system on the ship 110 can back up the GPS landing system on the aircraft 105.

FIG. 2 is a block diagram of a radar landing system 205 and a GPS landing system 215. The radar landing system 205 (e.g., a SPN-46 landing system) may be executed by one or more computing systems disposed on the ship 110. The radar landing system 205 may include hardware and/or software components for performing the functions recited herein. As shown, the radar landing system 205 includes the antenna array 125 which outputs data that is processed by the system 205 to generate radar derived location data 210. As discussed later, the radar landing system 205 uses the radar derived location data 210 to generate commands which can be used by a piloting system to fly the aircraft 105.

Although shown as being disposed on the ship 110, in other examples, the radar landing system 205 is disposed on the aircraft 105. In this scenario, the data captured by the antenna array 125 is transmitted via the transmitter 130 to the aircraft 105 which processes the data to generate the radar derived location data 210. In another aspect, neither the ship 110 nor the aircraft 105 include the radar landing system 205 and instead may rely solely on the GPS landing system 215 to land the aircraft. In this example, the ship 110 may still include the antenna array 125 and the necessary logic for deriving the location of the aircraft 105 relative to the ship 110 but does not include the remaining logic for determining specific commands for flying the aircraft 105.

The aircraft 105 includes the GPS landing system 215 (e.g., Joint Precision Approach and Landing System (JPALS)) which uses ship GPS data 220, aircraft GPS data 225, ship inertial data 230, aircraft inertial data 235, and the radar derived location data 210 as inputs. The ship GPS data 220 defines a GPS location of the ship 110 and is transmitted to the aircraft 105 via the transmitter 130. The aircraft GPS data 225 defines the GPS location of the aircraft 105 and is determined using the GPS receiver 115 on the aircraft 105.

The ship inertial data 230 may be measured using one or more sensors on the ship 110 which capture linear and rotational position, rates, and accelerations corresponding to the roll, pitch, and/or yaw of the ship 110. This data 230 may also be transmitted from the ship 110 to the aircraft 105 via the transmitter 130. The aircraft inertial data 235 may be measured using one or more sensors on the aircraft 105 that are communicatively coupled to an inertial measuring unit (IMU). The aircraft inertial data 235 may measure changes in linear and rotational acceleration of the aircraft 105, the orientation of the aircraft 105, and the like. As described in more detail below, the ship GPS data 220, aircraft GPS data 225, ship inertial data 230, and the aircraft inertial data 235 may be used by the GPS landing system 215 to generate flight control signals for landing the aircraft 105 on the ship 110. However, if the ship GPS data 220 and/or the aircraft GPS data 225 becomes unreliable, the GPS landing system 215 instead uses the radar derived location data 210 in combination with ship inertial data 230 and aircraft inertial data 235 to generate the flight control signals.

GPS landing system 215 may be executed by one or more computing systems disposed on the aircraft 105. For example, the GPS landing system 215 may include hardware or software components executing on the aircraft 105. Although not shown, the aircraft 105 may include one or more processors and memory that stores an application (i.e., a GPS landing application) that executes the GPS landing system 215. Moreover, the aircraft 105 includes a communication module 245 and the antenna 120 for communicating with the ship 110. Using the communication module, the aircraft 105 can receive the radar derived location data 210, command signals from the radar landing system 205, the ship inertial data 230, and the like.

FIG. 3 is a block diagram of a radar landing system 205 which include a relative position calculator 305 and a command generator 310. The relative position calculator 305 uses radar data captured by an antenna array mounted at the landing site to determine a position between the landing site (e.g., the ship) and the aircraft.

The relative position calculator 305 outputs radar derived location data 210 which includes an altitude measurement ($Z_{ALT}$), range measurement ($X_{RANGE}$), and position measurement ($Y_{POS}$). The altitude measurement $Z_{ALT}$ is the current altitude of the plane relative to the runway—e.g., a desired touchdown point on the runway. The range measurement $X_{RANGE}$ is the distance from the touchdown point on the runway to the aircraft assuming both the touchdown point and the aircraft are projected onto the same plane (e.g., a plane parallel with the runway). The position measurement $Y_{POS}$ is the offset of the aircraft relative to a center line of the runway. For example, a negative position measurement may indicate the aircraft is to the left of the center line (relative to a view of the aircraft from the runway) while a positive position measurement indicates the aircraft is to the right of the center line.

The aspects herein are not limited to any particular technique or algorithm for measuring the radar derived location data 210. Generally, the relative position calculator 305 uses the radar data to identify a location of the aircraft and then compares this location of the location of the landing site. This relative offset is defined by the altitude, range, and position measurements.

The command generator 310 uses the location data 210 to derive commands for controlling the aircraft along a glideslope that results in the aircraft landing on the runway. In this example, the command generator 310 outputs a vertical rate command 320 which controls the altitude of the aircraft and a bank angle command 325 which turns the aircraft. The aspects herein are not limited to any particular technique for deriving these commands. Once generated, the radar landing system 205 forwards the vertical rate command 320 and bank angle command 325 to the transmitter 130 which outputs the commands to the aircraft.

In one aspect, the aircraft uses the commands 320 and 325 to fly the aircraft. For example, in a UAV, the commands 320 and 325 are fed directly into the piloting systems which then control the actuators in the plane to result in the desired glideslope. If the aircraft is manned, the commands 320 and 325 may be used by an autopilot system to fly the aircraft hands free. However, in another aspect, the vertical and lateral error signals from the command generator 310 are visually displayed to the pilot who then can use the commands as a guide to control the aircraft—i.e., a hands-on mode.

Figure 4:
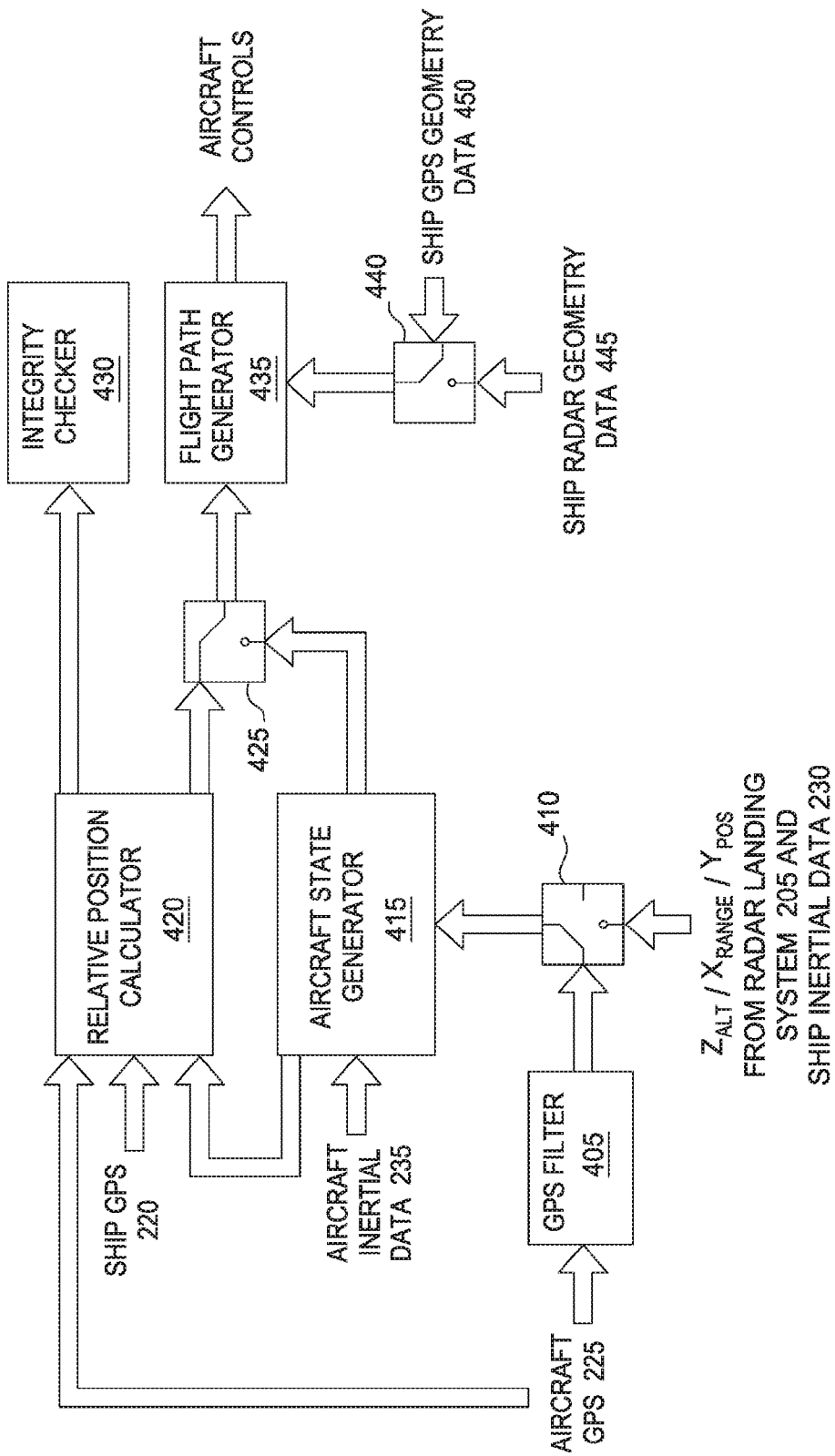
FIG. 4 is a block diagram of a normal operating state of a GPS landing system.

FIG. 4 is a block diagram of a normal operating state of a GPS landing system 215. In this operating state, the GPS landing system 215 controls the aircraft using GPS data received from the landing site (e.g., a ship) and the aircraft's own GPS data. To switch between the normal operating state and a backup operating state (which is described in FIG. 5), the GPS landing system includes switches 410, 425, and 440 (also referred to as switching logic). By changing the state of these switches 410, 425, and 440, the GPS landing system 215 switches between its normal operating state and the backup operating state. Moreover, although FIG. 4 illustrates the switches as hardware switches, these may be conditional logic in software or firmware which control how the application executing the GPS landing system 215 functions.

As shown in the lower left of FIG. 4, the aircraft GPS data 225 is inputted into a GPS filter 405 which uses one or more digital filters to process the data. Once filtered, the GPS data passes the data to the switch 410. Because the GPS landing system 215 is currently in the normal operating state (i.e., the GPS data 225 is reliable), switch 410 forwards the GPS data to an aircraft state generator 415. That is, in FIG. 4, the $Z_{ALT}$, $X_{RANGE}$, and $Y_{POS}$ measurement values (i.e., the radar derived location data 210) is not used in the GPS landing system 215 to generate aircraft control signals for flying the aircraft.

The aircraft state generator 415 receives the aircraft GPS data and the aircraft inertial data 235 as inputs. Generally, the aircraft state generator 415 uses the inertial data 235 to extrapolate a plurality of locations of the aircraft from the GPS data 225. GPS systems provide location signals two every second (e.g., 2 Hz signals). As such, using GPS alone, the GPS landing system 215 can identify the location of the aircraft in free space at a rate of twice a second. Because more fidelity may be desired, the aircraft state generator 415 extrapolates additional locations of the aircraft using the aircraft inertial data 235. Stated differently, the aircraft state generator 415 uses the pitch, yaw, etc. of the aircraft measured by the IMU to determine the location of the aircraft at a faster rate—e.g., 100 times a second (100 Hz). Of course, this upsampling can be modified to yield any desired number of locations per unit of time. As used herein, these extrapolated locations are referred to as the state of the aircraft and define the position of the aircraft in free space.

As shown, the output of the aircraft state generator 415 is forwarded to a relative position calculator 420 which determines the relative position of the aircraft to the ship. To do so, the relative position calculator 420 uses the ship GPS data 220 and the aircraft GPS 225 data as inputs. In one embodiment, the ship GPS data 220 and the aircraft GPS 225 are derived using the same GPS satellites. The relative position calculator 420 includes a differential GPS calculator for identifying the position of the aircraft relative to the ship. Although not shown in FIG. 4, the relative position calculator 420 may also receive the inertial data of the ship. Because the ship GPS location is also updated only twice a second, the relative position calculator 420 may use the inertial data of the ship to extrapolate locations of the ship at the equivalent rate the aircraft state generator 415 outputs the state of the aircraft—e.g., 100 Hz. Thus, in this aspect, the location of the aircraft and the ship are updated at the same rate.

Using the locations of the ship and the aircraft, the relative position calculator 420 determines the relative location of the aircraft to the point on the ship where the aircraft should land. For example, the calculator 420 may perform a similar measurement as described above in the radar landing system to generate altitude, range, and position measurement values for landing at a touchdown point on the ship. The relative position calculator 420 forwards the relative position of the aircraft to the integrity checker 430 and to switch 425. The integrity checker 430 uses the position to ensure the relative location derived by the calculator 420 is accurate. For example, the integrity checker 430 may be tasked to determine whether the ship or aircraft GPS is reliable. If either becomes corrupted, the integrity checker 430 may switch from the normal operating state to the backup state discussed below. However, in another aspect, the GPS landing system 215 may include other sensors or logic for determining if the aircraft GPS data 225 or the ship GPS data 220 is unreliable. For example, the GPS landing system 215 may include a system or device to determine if the GPS receiver has failed, or determine if the GPS signals have been jammed or become corrupted.

Assuming the relative location derived by the calculator 420 is accurate, the switch 425 forwards this location to a flight path generator 435 which processes the location to derive command signals for controlling the piloting system of the aircraft. Like the radar landing system, the flight path generator 435 may generate aircraft control signals which steer the aircraft along a desired glideslope in order to land on the ship. For example, the flight path generator 435 may output vertical rate and bank commands to the piloting system which control the glideslope and lineup of the aircraft.

Figure 5:
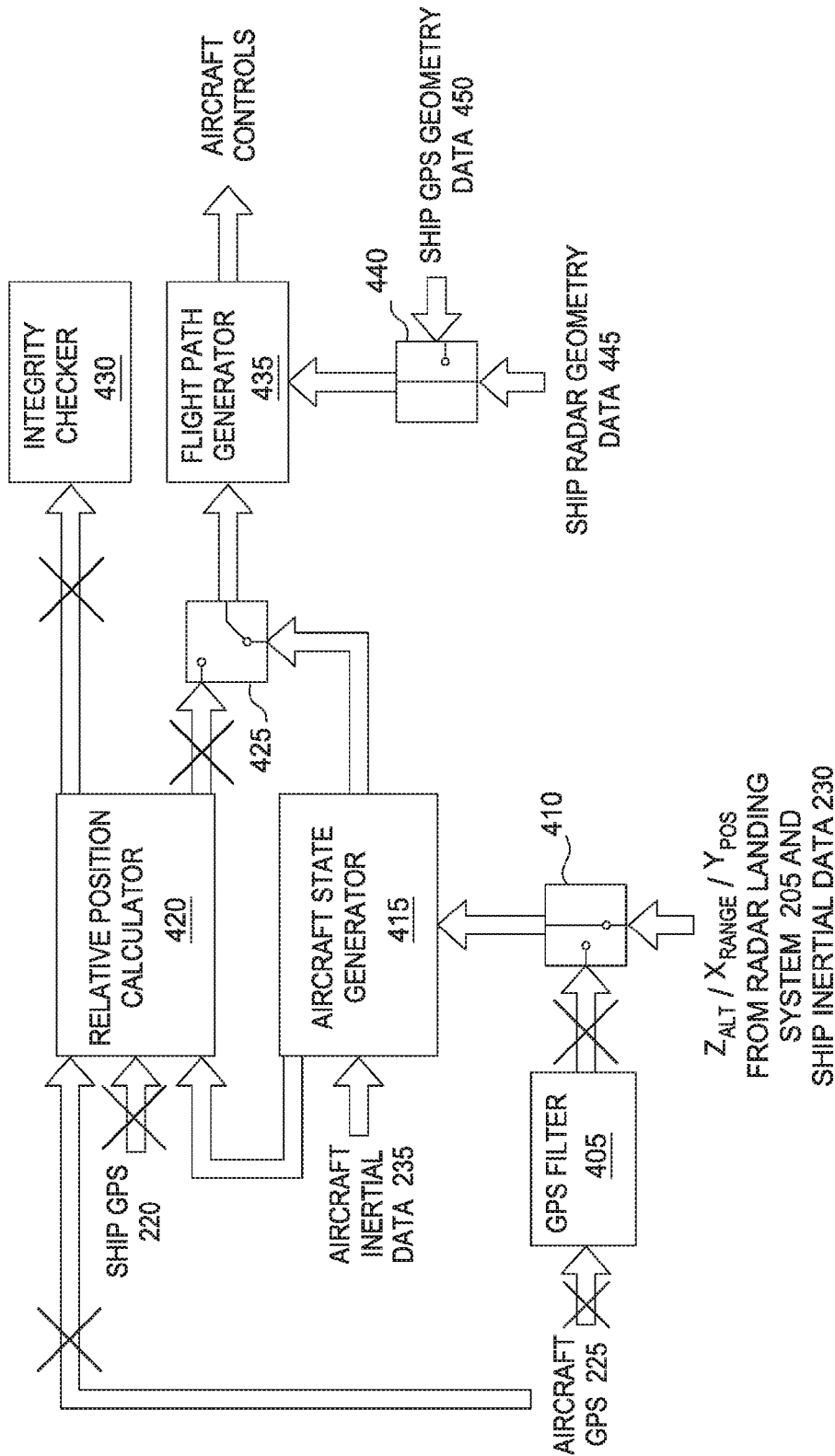
FIG. 5 is a block diagram of a backup operating state of the GPS landing system.

FIG. 5 is a block diagram of a backup operating state of the GPS landing system 215. Once the GPS landing system (or some other monitoring system) determines the ship GPS data, the aircraft GPS data, or GPS ship relative solution is unreliable, the GPS landing system 215 switches into the backup operating state. This change in states is illustrated in FIG. 5 by changing the state of each of the switches 410, 425, and 440. Again, this may done using hardware switches or by using conditional logic within software.

The "X's" in FIG. 5 illustrate components or data in the GPS landing system 215 that are unused or deactivated when operating in the backup operating state. As shown, the aircraft GPS data 225 and ship GPS data 220 are no longer used to derive the aircraft control signals. As a result, the GPS filter 405 and relative position calculator 420 or either unused or output data that is ignored. Instead of forwarding the aircraft GPS data 225 to the aircraft state generator 415, the switch 410 forwards the radar derived location data to the generator 415. In one aspect, the ship may constantly forward the radar derived location data it generates to the aircraft. Alternatively, the ship begins forwarding location data only in response to determining the GPS data is unreliable. In addition to sending the $Z_{ALT}$, $X_{RANGE}$, and $Y_{POS}$ measurements derived from radar, the GPS landing system 215 also receives the ship inertial data—e.g., the movement or acceleration of the ship. Of course, if the landing site is stationary, the ship inertial data will represent the aircraft precision position relative to the fixed inertial runway touchdown point.

The aircraft state generator 415 uses the aircraft inertial data 235, the radar derived location data, and the ship inertial data to calculate the state of the aircraft. For example, the aircraft state generator 415 may extrapolate additional locations from the measurements received from the radar landing system to increase the rate at which the state of the aircraft is calculated. For instance, the radar derived location data may be generated at a rate of 20 Hz, but the GPS landing system may want to calculate the state of the aircraft at a rate of 100 Hz and thus, uses inertial data to generate additional aircraft states. Moreover, while the ship and aircraft GPS data usually contains noise, the ship and aircraft inertial data is relatively smooth and noiseless. Using the inertial data smooths to calculate the state of the aircraft smooths the noisy data and provides an accurate landing solution.

The aircraft state generator 415 forwards the state of the aircraft to the switch 425 which bypasses the relative position calculator 420. Put differently, because the relative position of the aircraft to the ship was calculated by the radar on the ship, the calculation performed by the relative position calculator 420 is not needed when operating in the backup state. Instead, the state of the aircraft is forwarded directly to the flight path generator 435 which can use the relative location of the aircraft to the ship to generate the aircraft control signals.

Moreover, switch 440 forwards ship radar geometry data 445 to the flight path generator 435 (rather than ship GPS geometry data 450) which uses the data to account for the particular location on the ship where the aircraft should land—e.g., the touchdown point on the ship. For example, the GPS landing system 215 may be biased relative to the location of the touchdown point. However, the ship geometry may have already been accounted for by the radar system when generating the $Z_{ALT}$, $X_{RANGE}$, and $Y_{POS}$ measurements. Thus, activating switch 440 ensures the ship geometry is zeroed out rather than being accounted for twice by both the radar landing system and the GPS landing system 215. Regardless, the ship radar geometry data 445 and the ship GPS geometry data 450 provide lever arm corrections that, when application to the solution, result in the aircraft landing at the desired touchdown point on the landing site.

Moreover, if for some reason the aircraft must abort its landing and circle around for another pass, the GPS landing system 215 can continue to fly the aircraft without receiving updated radar location data or update GPS data (i.e., the GPS signals are jammed or the GPS receiver has failed). That is, once the aircraft aborts and veers away from the desired landing glideslope, the aircraft may eventually leave the beam pattern of the radar. As a result, the ship can no longer provide the relative location of the aircraft to the ship since the aircraft is outside the beam pattern of the radar. However, the GPS landing system continues to process the aircraft inertial data 235 and the ship inertial data 230 as this data is updated and extrapolate its current location relative to the ship. That is, the GPS landing system can monitor changes in accelerations indicated in the inertial data 235 and 230 and determine the current location of the aircraft relative to the ship using the last known location provided by the radar derived location data. Eventually, the location calculated by the GPS landing system using the aircraft inertial data 235 and 230 will diverge from the actual location of the aircraft and ship, but the calculated location is typically reliable for several minutes (e.g., up to ten or twenty minutes) which is more than enough time for the aircraft to circle around and retry the approach. Once the aircraft has circled around and is again within the beam pattern of the radar, the ship can begin sending updated radar derived location data which the aircraft can use to resolve its current relative location. The aircraft can then try again to land using the commands generated by the GPS landing system 215 using the radar derived location data as an input.

Comparing FIG. 4 to FIG. 5 illustrates switching between a first operating state (e.g., the normal operating state) to a second operating state (e.g., the backup operating state). When doing so, some of the components or modules in the GPS landing system 215 are no longer used. For example, the GPS filter 405, the relative position calculator 420, and the integrity checker 430 are either unused or generate data that is ignored. In the second operating state, at least one of the modules or components in the GPS landing system 215 (i.e., the aircraft state generator 415 and the flight path generator 435) are still used to generate the control signals. In this example, the same algorithms and techniques in the GPS landing system 215 can be used to process both GPS locations as well as radar derived location data. However, even though the aircraft state generator 415 and flight path generator 435 operate while the GPS landing system 215 is in the backup state, that does not necessarily imply that these components function in the exact same way as when operating in the first operating state. For example, because the structure and type of the data received by the aircraft state generator 415 during the second operating state (e.g., the radar derived location data) is different than the data received during the first operating state (e.g., the GPS data), the algorithms or processing performed by the generator 415 may be modified or altered to accommodate these differences.

In one aspect, the radar landing system 205 shown in FIG. 3 is a backup system to the GPS landing system 215. For example, the GPS landing system 215 may become inoperable because of a hardware or a software failure. Put differently, the GPS landing system 215 may be unable to accurately fly the aircraft regardless of whether the GPS signals or the radar derived location data is used an inputs. For example, the application executing the GPS landing system may crash or a computing system executing the GPS landing system may have a faulty hardware component. In response, the aircraft may use the vertical rate command 320 and bank angle command 325 generated by the radar landing system 205 shown in FIG. 3 to land the aircraft even if these signals are less predictable than using the commands generated by the GPS landing system 215.

In another aspect, the commands generated by the radar landing system 205 are not used as a backup to the GPS landing system 215. Instead, if the GPS signals become unreliable, the radar derived location data 210 is used by the GPS landing system but the vertical rate command 320 and bank angle command 325 are not. For example, these commands may not be a suitable for flying a UAV safely in some situations. Thus, the radar landing system 205 on the ship may include only the relative position calculator 305 of the radar landing system 205 since the command generator 310 is not needed. Stated differently, if the aircraft never uses the commands provided by the command generator 310, then this component can be eliminated from the radar landing system 205.

Figure 6:
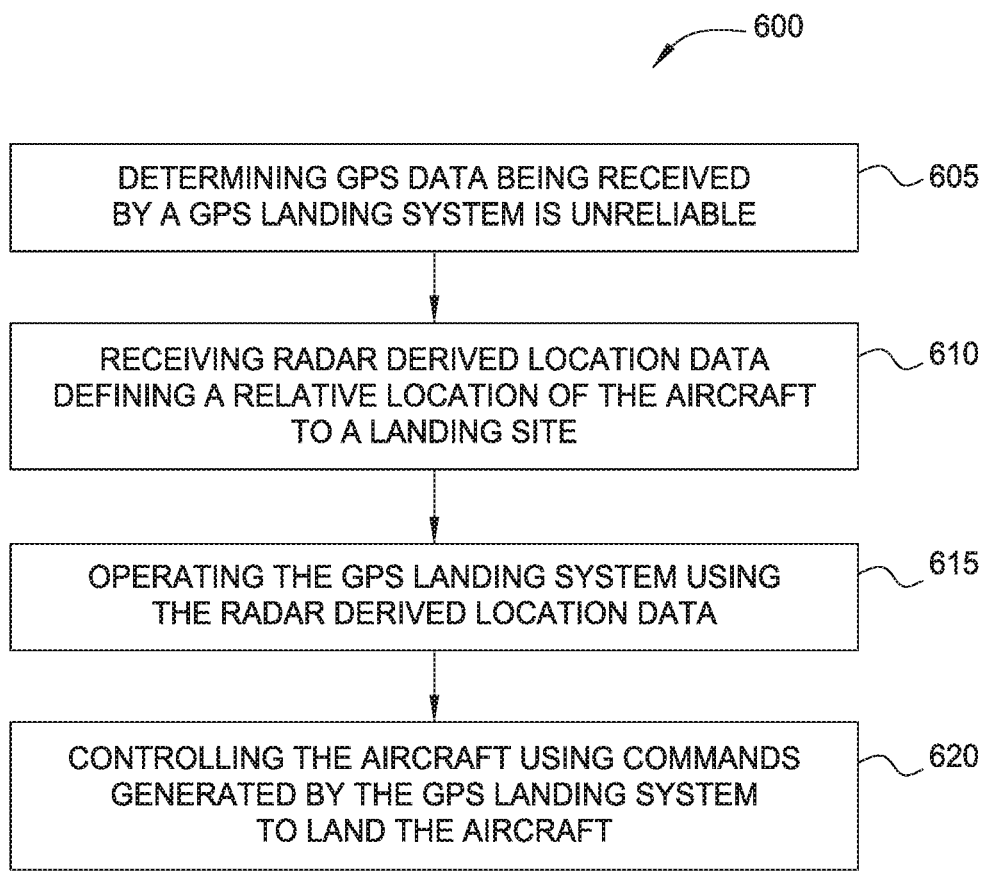
FIG. 6 is a flowchart for operating a GPS landing system using radar derived location data.

FIG. 6 is a flowchart of a method 600 for operating a GPS landing system using radar derived location data. When operating normally, the GPS landing system generates control signals for flying the aircraft using GPS signals as an input. At block 605, the aircraft determines the GPS signals are unreliable. As discuss above, GPS signals may be jammed or the GPS satellites may malfunction and stop sending signals. In another example, the GPS receiver on either the aircraft or the ship may malfunction. In one aspect, because the GPS landing system uses the GPS locations of both the ship and aircraft to fly the aircraft, the GPS landing system may be unable to function properly if either of these GPS locations are no longer available.

At block 610, the aircraft receives radar derived location data defining a relative location of the aircraft to the landing site. In one aspect, the radar derived location data includes the distance from the aircraft to a touchdown point on the landing site. At block 615, instead of using the GPS data, the GPS landing system uses the radar derived location data as inputs. For example, the algorithms and processes performed by the GPS landing system may be modified to process the radar derived location data, but the GPS landing system can use at least some of the same modules and components to process the data.

At block 620, a piloting system controls the aircraft using commands generated by the GPS landing system to land the aircraft. For example, the piloting system may be used in a manned aircraft (e.g., a plane or helicopter) or in an unmanned aircraft (e.g., a UAV). In one aspect, the GPS landing system generates the same commands for controlling the aircraft when using the GPS locations as an input as when using the radar derived location data. For example, the GPS landing system may output a vertical rate command and a bank angle command regardless whether GPS signals or radar derived location data is used as an input.

In the preceding paragraphs, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim(s).

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor comprising hardware and software to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices comprising hardware and software from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects disclosed herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects, other and further aspects may be devised without departing from the basic scope thereof, and the scope thereof is determined by the claims that follow.

What is claimed is:

1. A method, comprising:
   operating, using one or more computer processors, a global position satellite (GPS) landing system to generate control signals for flying an aircraft using GPS signals as an input;
   receiving radar derived location data indicating a relative location of the aircraft to a landing site; and
   operating the GPS landing system to generate control signals for flying the aircraft using the radar derived location data as the input, in lieu of the GPS signals.

2. The method of claim 1, wherein operating the GPS landing system using the GPS signals as the input is a normal operating state and operating the GPS landing system using the radar derived location data as the input is a backup operating state performed upon determining the GPS signals are unreliable.

3. The method of claim 2, wherein the GPS signals are not used during the backup operating state and the radar derived location data is not used during the normal operating state.

4. The method of claim 2, further comprising:
   determining, using a relative position calculator, a relative position of the aircraft to the landing site during the normal operating state based on a GPS location of the aircraft and a GPS location of the landing site, wherein the relative position calculator is unused when the GPS landing system operates in the backup operating state.

5. The method of claim 2, wherein at least one component used in the GPS landing system when operating in the normal operating state is also used when operating in the backup operating state.

6. The method of claim 1, wherein the radar derived location data indicates a distance from the aircraft to a touchdown point on the landing site, wherein the landing site is a ship.

7. The method of claim 6, wherein the radar derived location data is generated using a radar antenna mounted on the ship.

8. The method of claim 6, further comprising:
   receiving inertial data indicating movements of the ship; and
   operating the GPS landing system using both the inertial data and the radar derived location data as inputs to fly the aircraft when GPS signals are unreliable.

9. A system, comprising:
   a processor; and
   memory storing an GPS landing application, the GPS landing application is executable by the processor to perform an operation, the operation comprising:
      generating control signals for flying an aircraft using GPS signals as an input;
      receiving radar derived location data indicating a relative location of the aircraft to a landing site; and
      generating control signals for flying the aircraft using the radar derived location data as the input, in lieu of the GPS signals.

10. The system of claim 9, wherein generating control signals using the GPS signals as the input is a normal operating state of the GPS landing application and generating control signals using the radar derived location data as the input is a backup operating state of the GPS landing application performed upon determining the GPS signals are unreliable.

11. The system of claim 10, wherein the GPS signals are not used during the backup operating state and the radar derived location data is not used during the normal operating state.

12. The system of claim 10, where the operation further comprises:
   determining, using a relative position calculator, a relative position of the aircraft to the landing site during the normal operating state based on a GPS location of the aircraft and a GPS location of the landing site, wherein the relative position calculator is unused when the GPS landing system operates in the backup operating state.

13. The system of claim 10, wherein at least one component used in the GPS landing application when operating in the normal operating state is also used when operating in the backup operating state.

14. The system of claim 9, wherein the radar derived location data indicates a distance from the aircraft to a touchdown point on the landing site, wherein the landing site is a ship.

15. The system of claim 14, wherein the operation further comprises:
   receiving inertial data indicating movements of the ship; and
   generating control signals to fly the aircraft using both the inertial data and the radar derived location data as inputs when GPS signals are unreliable.

16. A non-transitory computer-readable storage medium having computer-readable program code embodied therewith, the computer-readable program code executable by one or more computer processors to:
   operate a GPS landing system to generate control signals for flying an aircraft using GPS signals as an input;
   receive radar derived location data indicating a relative location of the aircraft to a landing site; and
   operate the GPS landing system to generate control signals for flying the aircraft using the radar derived location data as the input, in lieu of the GPS signals.

17. The computer-readable storage medium of claim 16, wherein operating the GPS landing system using the GPS signals as the input is a normal operating state and operating the GPS landing system using the radar derived location data as the input is a backup operating state performed upon determining the GPS signals are unreliable.

18. The computer-readable storage medium of claim 17, wherein the GPS signals are not used during the backup operating state and the radar derived location data is not used during the normal operating state.

19. The computer-readable storage medium of claim 17, wherein the computer-readable program code is executable to:
    determine, using a relative position calculator, a relative position of the aircraft to the landing site during the normal operating state based on a GPS location of the aircraft and a GPS location of the landing site, wherein the relative position calculator is unused when the GPS landing system operates in the backup operating state.

20. The computer-readable storage medium of claim 16, wherein the radar derived location data indicates a distance from the aircraft to a touchdown point on the landing site, wherein the landing site is a ship.

\* \* \* \* \*